(12) United States Patent
Wang et al.

(10) Patent No.: US 8,669,856 B2
(45) Date of Patent: Mar. 11, 2014

(54) METHOD TO CALIBRATE DIGITAL SPEEDOMETER DISPLAY TO METER SPEEDOMETER DISPLAY

(75) Inventors: Tony Wang, Marysville, OH (US); Natarajan S. Manakkal, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 566 days.

(21) Appl. No.: 12/952,421

(22) Filed: Nov. 23, 2010

(65) Prior Publication Data
US 2012/0127180 A1 May 24, 2012

(51) Int. Cl.
*B60Q 1/00* (2006.01)

(52) U.S. Cl.
USPC .......... 340/438; 340/441; 340/461; 340/576; 341/144; 116/284; 345/7; 345/629; 367/13; 701/29.6; 701/31.4; 701/32.4; 701/70; 702/100; 702/88; 702/92; 702/96

(58) Field of Classification Search
USPC .............. 116/284; 340/438, 461, 576, 441; 341/144; 345/7, 629; 367/13; 701/29.6, 701/31.4, 32.4, 70; 702/88, 92, 96, 100
See application file for complete search history.

(56) References Cited

U.S. PATENT DOCUMENTS

| | | | | |
|---|---|---|---|---|
| 5,357,451 A * | 10/1994 | Beaudry et al. | | 702/88 |
| 5,376,917 A * | 12/1994 | Yoshimoto et al. | | 340/438 |
| 5,465,079 A * | 11/1995 | Bouchard et al. | | 340/576 |
| 5,499,182 A * | 3/1996 | Ousborne | | 701/29.6 |
| 5,825,338 A * | 10/1998 | Salmon et al. | | 345/7 |
| 6,498,976 B1 * | 12/2002 | Ehlbeck et al. | | 701/70 |
| 6,515,676 B1 * | 2/2003 | Kato et al. | | 345/629 |
| 6,529,845 B1 * | 3/2003 | Beck, II | | 702/100 |
| 6,679,702 B1 | 1/2004 | Rau | | |
| 6,844,811 B2 * | 1/2005 | Hayashi et al. | | 340/441 |
| 7,392,145 B1 * | 6/2008 | Romano | | 702/96 |
| 7,460,950 B2 * | 12/2008 | Wurth | | 701/32.4 |
| 7,538,662 B2 * | 5/2009 | Allmendinger | | 340/461 |
| 2005/0139143 A1 * | 6/2005 | Dinh et al. | | 116/284 |
| 2005/0212669 A1 * | 9/2005 | Ono et al. | | 340/461 |
| 2006/0064240 A1 * | 3/2006 | Wurth | | 701/201 |
| 2009/0261960 A1 * | 10/2009 | Sullivan et al. | | 340/438 |
| 2009/0292496 A1 * | 11/2009 | Schierbeek et al. | | 702/92 |
| 2010/0052964 A1 * | 3/2010 | Lee et al. | | 341/144 |
| 2011/0158040 A1 * | 6/2011 | Kooper et al. | | 367/13 |
| 2011/0193694 A1 * | 8/2011 | Bowden et al. | | 340/438 |
| 2011/0276216 A1 * | 11/2011 | Vaughan | | 701/29 |

FOREIGN PATENT DOCUMENTS

JP 2009 103540 A2 5/2009

OTHER PUBLICATIONS

SAE Technical Paper Series No. 920599, "Development of an Analog Speedometer Mutually Compatible with a Digital Head Up Display", Nagami et al., 1992.

* cited by examiner

*Primary Examiner* — Daniel Wu
*Assistant Examiner* — Israel Daramola
(74) *Attorney, Agent, or Firm* — Fay Sharpe LLP

(57) ABSTRACT

A method and system for calibrating a digital speedometer display to match an analog speedometer indicated value. The method generally includes calibrating each analog speedometer unit such that the exact deviation or "offset" from the center point of the analog speedometer is known. This measured deviation is then used to adjust the value input to the digital display thereby making the digital display value match the indicated value of the analog speedometer.

16 Claims, 3 Drawing Sheets

METHOD TO CALIBRATE DIGITAL SPEEDOMETER DISPLAY TO METER SPEEDOMETER DISPLAY

BACKGROUND

In today's automobiles, it is becoming more common to provide both an analog and digital speed display. In a typical arrangement, an analog gauge cluster may be provided having both a speedometer and a tachometer and one or more system gauges such as a fuel gauge, a temperature gauge, an oil gauge, etc. A digital display, often located adjacent the analog gauge cluster or as a part of the analog gauge cluster, may typically include an LCD screen capable of displaying information such as a digital readout of the vehicle speed, and/or digital readouts of information associated with one or more of the other analog gauges, for example. Such combined displays are sometimes referred to as combimeters.

In some arrangements, the digital speed display may be associated with a cruise control system. For example, a driver may set the cruise control speed based on the speed indicated on the digital speed display. Using the digital speed display, the user can set a more precise speed to be maintained by the cruise control system.

One problem that may arise when displaying both an analog and a digital speed to a driver is that the analog gauge display may indicate a different speed than the digital display. The differences between the two displays can lead to driver distraction and/or irritation. Moreover, although both the analog gauge and digital gauge may be working properly, some drivers may register complaints due to the discrepancy. These complaints can be costly in that auto dealers and/or manufacturers must spend time and resources to address the concerns. Ultimately, however, since the discrepancy is inherent in the system, nothing can be done to rectify the situation beyond educating the consumer that some discrepancy may exist. While some consumers may accept such outcome, other drivers may remain dissatisfied.

In a typical prior art system, the analog speedometer unit sends a speed value to a control unit which in turn outputs a digital speed value to a digital display. Because of needle position variations from one analog speedometer to the next, the speed indicated by the needle of a given analog speedometer will often vary from the digital speed value displayed by the digital display, even though both the analog speedometer and the digital display are receiving signals corresponding to a common speed. In other words, a given analog speedometer display input value can result in different indicated speeds on various analog speedometers, but should always generally result in the same speed value being displayed on a digital display.

Prior art systems have attempted to minimize the difference between the analog speedometer and the digital display by utilizing the center point of the speedometer tolerance range. Such systems generally apply a correction factor to the digital display readout based upon an average deviation between the actual speed and the displayed speed for a given analog speedometer. As will be appreciated, such systems do not eliminate the problem since most gauges will not have an offset that corresponds to the average deviation. Thus, in many instances the discrepancy between the two gauges will remain, although on a reduced basis, and still result in driver distraction and/or irritation, and/or consumer complaints.

SUMMARY

The present disclosure provides a method and system for calibrating a digital speedometer display to match an analog speedometer indicated value. The method generally includes calibrating each analog speedometer unit such that the exact deviation or "offset" from the center point of the analog speedometer is known. This measured deviation is then used to adjust the value input to the digital display thereby making the digital display value match the indicated value of the analog speedometer.

In accordance with one aspect of the present disclosure, a method is provided for adjusting a displayed value of a digital gauge display to match a value indicated by a corresponding analog gauge in a system having both an analog and digital displays displaying common information. The method comprises determining an analog gauge offset value corresponding to a difference between an anticipated analog gauge display value and a value physically indicated by the analog gauge when a given analog gauge input signal is provided to the analog gauge, providing the analog gauge offset value to a controller adapted to send a digital gauge input signal to the digital gauge display to display a value on the display, generating the digital gauge input signal by adding the analog gauge offset value to the analog gauge input signal, and sending the digital gauge input signal to the digital gauge.

The step of determining the analog gauge offset value can include applying a test analog input signal to the analog gauge, said test signal corresponding to an anticipated analog gauge display value, observing the value physically displayed by the analog gauge in response to application of the test signal, and storing the difference between the anticipated value and the observed value in a memory associated with the analog gauge. The step of providing the analog gauge offset value to the controller can include accessing the value stored in a memory associated with the analog gauge. The step of determining the analog gauge offset value can be performed prior to the analog gauge being installed in the system. The step of determining the analog gauge offset value can include applying an analog gauge input signal corresponding to a theoretical midpoint value of the analog gauge, and measuring the offset of an indicator of the gauge from the theoretical midpoint value. The step of determining the analog gauge offset can include determining the analog gauge offset for a plurality of anticipated analog display values, and further comprises the step of storing the analog gauge offsets in an associated memory from which the values can be provided to the controller. The step of determining the analog gauge offset can include using an electronic sensor to detect a value indicated by the analog gauge in response to application of the analog gauge input signal.

In accordance with another aspect, a system for displaying information comprises an analog gauge adapted to receive an analog gauge input signal and, in response thereto, indicate a value, a digital display adapted to receive a digital gauge input signal and in response thereto display a digital value, and a controller for generating the digital gauge input signal and sending said signal to the digital display. The controller is configured to receive an analog gauge offset value corresponding to a difference between an anticipated analog gauge display value and a value physically indicated by the analog gauge, and generate the digital gauge input signal by adding the analog gauge offset value to the analog gauge input signal.

The system can include a memory for storing at least one analog gauge offset value, the memory being accessible by the controller for providing the at least one gauge offset thereto. A plurality of gauge offset values can be stored in the memory, each gauge offset value corresponding a different anticipated analog gauge display value. The controller can be configured to utilize a gauge offset value corresponding to the analog gauge input value for generating the digital gauge input signal. The analog gauge can include a speedometer, and the digital display can include a digital speed display. The digital display can be associated with a cruise control system of an automobile.

The system can further comprise a memory for storing at least one analog gauge offset value, the memory being accessible by the controller for providing the at least one gauge offset thereto. A plurality of gauge offset values can be stored in the memory, each gauge offset value corresponding to a different anticipated analog gauge display value. The controller can be configured to utilize a gauge offset value corresponding to the analog gauge input value for generating the digital gauge input signal.

According to another aspect, an analog gauge comprises a gauge face having at least one marking corresponding to a value, a moveable indicator adapted to move relative to the at least one marking for indicating a value when an analog input signal is provided to the gauge, and a memory for storing at least one analog gauge offset value corresponding to a difference between an anticipated analog gauge display value and a value physically indicated by the analog gauge. The gauge can be configured to provide the analog gauge offset value to a controller configured to use the analog gauge offset value to generate a digital display signal for a digital display that corresponds to a value indicated by the analog display for a given analog display input signal. The analog gauge can include a speedometer.

DETAILED DESCRIPTION

Figure 1:
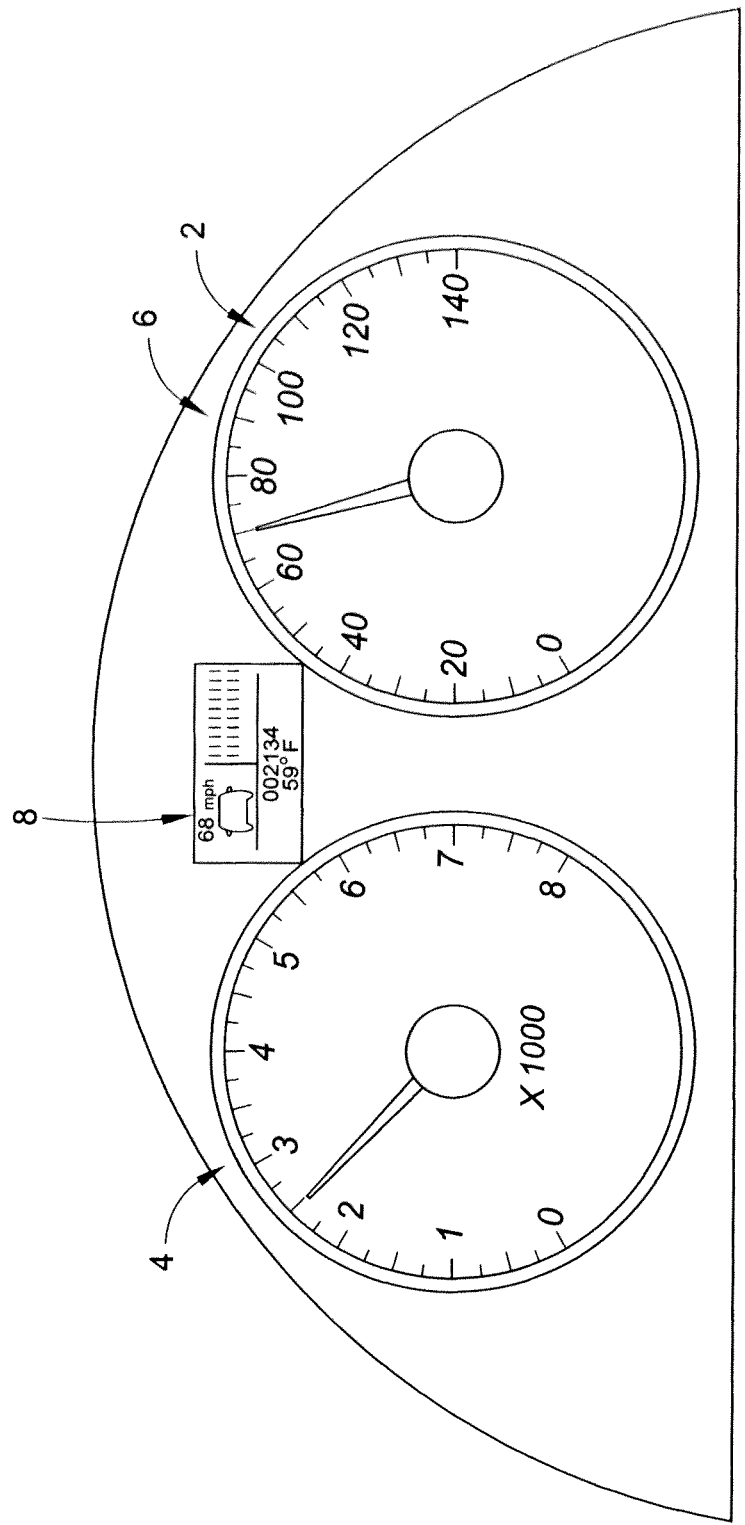
FIG. 1 is a prior art gauge cluster including an analog speedometer and a digital speed display.

In FIG. 1, a prior art gauge cluster 2 is illustrated including a tachometer 4, an analog speedometer 6 and a digital speed display 8. The analog speedometer 6 reads approximately 70 mph, while the digital speed display 8 reads 68 mph. It is this discrepancy between the analog speedometer and the digital speedometer that leads to driver distraction and/or irritation, and consumer complaints.

Figure 2:
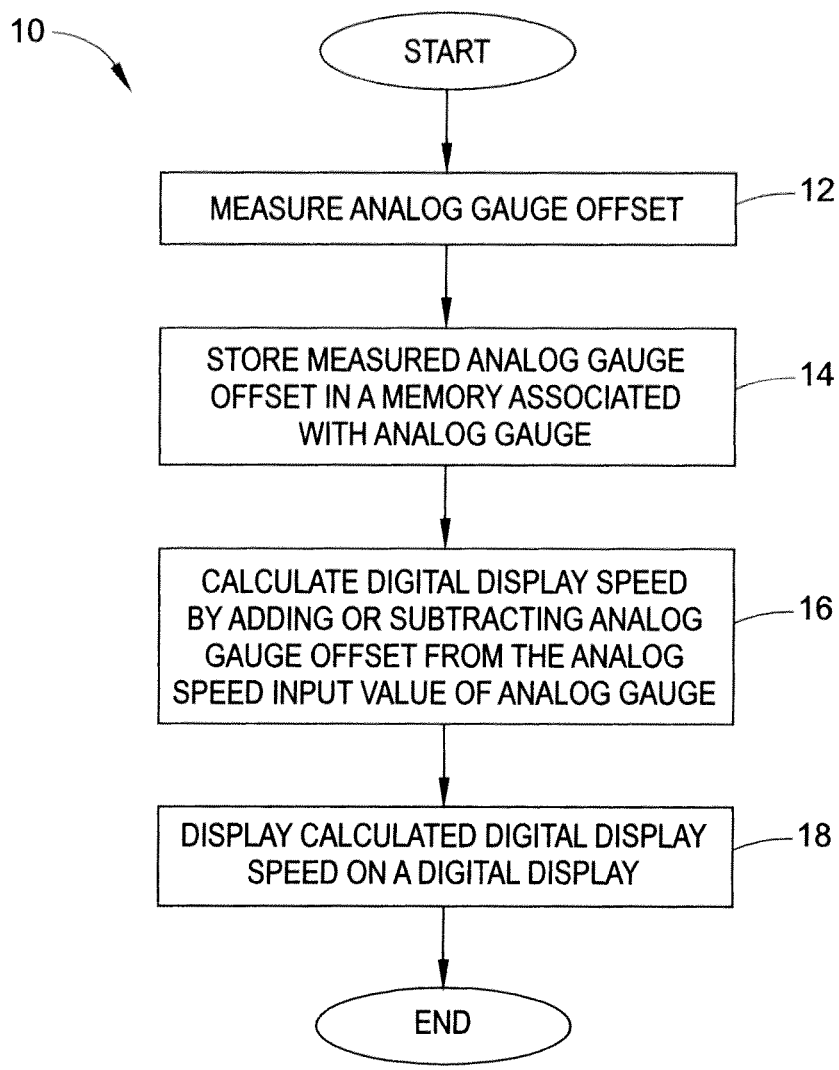
FIG. 2 is a flowchart illustrating an exemplary method in accordance with the present disclosure.

With reference to FIG. 2, and in accordance with the present disclosure, an exemplary method of reducing or eliminating the discrepancy between an analog speedometer indicated speed and a displayed speed on a digital speedometer is illustrated in flowchart form. The exemplary method is generally indicated by reference numeral 10. The method begins in process step 12 wherein the gauge offset of the analog gauge is measured. The gauge offset can be measured in a variety of different ways but preferably will be done by a gauge manufacturer at the final testing of the analog gauge. For example, an input signal corresponding to various different speeds can be applied to the gauge and the indicated value then measured in order to determine the gauge offset. It is possible to measure the gauge offset for virtually all of the possible indicated speeds, although depending on the application, only the offsets at certain speeds, or even a single speed, may be measured.

For example, a test signal may be applied to the analog gauge corresponding to an anticipated analog display value of 60 mph. The value physically indicated by the gauge may differ from the anticipated value of 60 (e.g., indicated value is 61 mph). The difference between the indicated value and the anticipated value (e.g., +1 mph) is the analog gauge offset. As noted, measuring the analog gauge offset at a single speed may be sufficient for some applications (e.g., measuring the offset at a midpoint value of the analog gauge). Alternatively, a test signal for a wide range of speeds could be applied and the gauge offset calculated at each of the various speeds.

Observation of the indicated speed can be performed by a technician reading the analog gauge and inputting the indicated speed to a system for storage in memory. Preferably, however, an automated system such as an electronic eye or other electronic device can be configured to sense the indicated speed for a given input signal in order to provide a fully automated calibration process.

Once the analog gauge offset is measured in process step 12, it is then stored in a memory associated with the analog gauge in process step 14. This memory can be associated with the gauge cluster including the analog gauge, or can be part of a vehicle's onboard computer. The location of the memory is not critical to the operation of the system, but should be chosen such that the gauge offset data can be easily provided to a vehicle's electronic control unit (ECU) or other controller that ultimately will use the information in order to synchronize the digital display to the analog display.

In process step 16, the digital display speed is calculated by adding or subtracting the analog gauge offset from the analog speed input value of the analog gauge. In process step 18, the digital display speed that was calculated in process step 16 is then displayed on a digital display.

Figure 3:
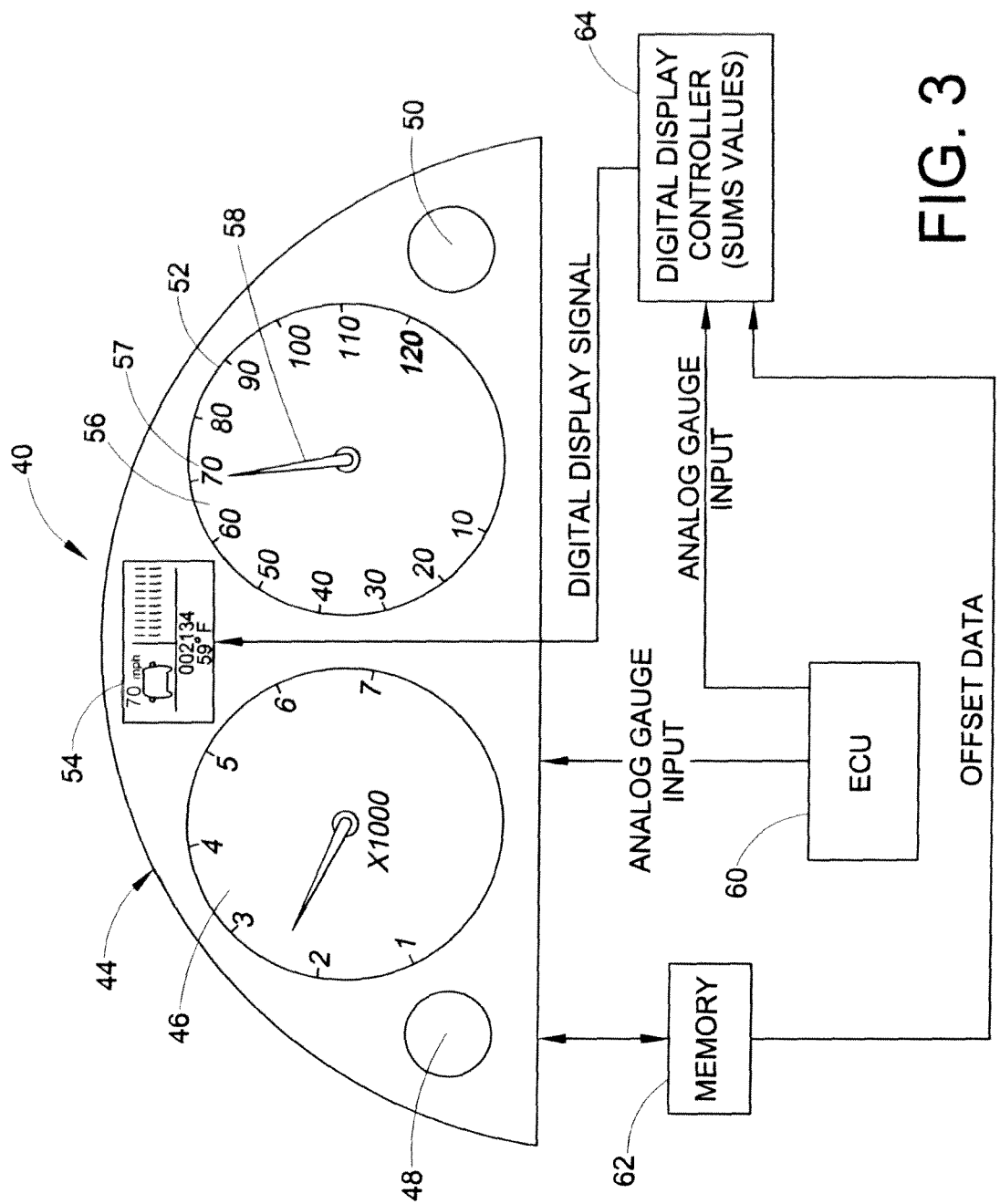
FIG. 3 is an exemplary system in accordance with the present disclosure including a gauge cluster having an analog speedometer display and a digital speed display.

Turning to FIG. 3, an exemplary system 40 in accordance with the present disclosure is illustrated. The system 40 includes a gauge cluster 44 having several gauges which can include a tachometer 46, a fuel gauge 48, a water temperature gauge 50, an analog speedometer 52 and a digital display 54 capable of displaying speed. The analog speedometer 52 includes a gauge face 56 having a plurality of indicators 57 in the form of numbers corresponding to various speeds, and a needle 58 moveable to indicate a speed. The system 40 further includes an ECU 60, which may be a typical vehicle ECU configured to, among other things, supply an analog gauge input signal to the analog speedometer 52. A memory 62 associated with the gauge cluster 44 stores therein one or more gauge offset values for the analog speedometer 52. These gauge offset values typically will be determined and stored into memory by the gauge or gauge cluster manufacture. Alternatively, the gauge offset values could be determined and stored into the associated memory 62 at a later time, such as during production of a vehicle at a factory, or by the consumer himself. In the latter scenario, the system 40 could be provided or connected to a user input that would allow a user to specify the offset value which could be ascertained by the user simply through operation of the vehicle. For example, if a user sets the analog speedometer to 70 mph using the vehicle's cruise control system, and notices that the digital display 54 is displaying 68 mph instead of 70 mph, the user could enter a +2 gauge offset value into memory 62 thereby calibrating the digital display 54 to match the analog speedometer 52.

Regardless of the manner in which the gauge offset values are stored in memory 62, the offset data will be sent to a digital display controller that is adapted to receive not only the offset data from the gauge cluster 44 but also the analog gauge input signal corresponding to the signal sent from the ECU 60 to the analog speedometer 52. The digital display controller 64 is adapted to sum the value of the analog gauge input signal and the gauge offset received from the gauge cluster 44. The digital display controller 64 then sends the summed value as a digital gauge input signal to the digital display 54.

Although illustrated as separate components in FIG. 3, it will be appreciated that the ECU 60, associated memory 62 and the digital display controller 54 may be integrated into a single unit that performs all of the described functions. Similarly, both the associated memory 62 and the digital display controller 64 could be integrated into the gauge cluster 44 and adapted to automatically adjust the digital gauge input signal as set forth previously.

As will now be understood, the present disclosure provides a method and system for eliminating or mitigating discrepancies in display values between an analog speedometer and a digital speed display.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for adjusting a displayed value of a digital gauge display to match a value indicated by a corresponding analog gauge in a system having both an analog and digital displays displaying common information, the method comprising:
    determining an analog gauge offset value corresponding to a difference between an anticipated analog gauge display value and a value physically indicated by the analog gauge when a given analog gauge input signal is provided to the analog gauge;
    providing the analog gauge offset value to a controller adapted to send a digital gauge input signal to the digital gauge display to display a value on the display;
    generating the digital gauge input signal by adding the analog gauge offset value to the analog gauge input signal;
    sending the digital gauge input signal to the digital gauge;
    displaying on the digital gauge a value corresponding to the input signal, said value corresponding to the input signal matching a value indicated by the analog gauge.

2. A method as set forth in claim 1, wherein the step of determining the analog gauge offset value includes applying a test analog input signal to the analog gauge, said test signal corresponding to an anticipated analog gauge display value, observing the value physically displayed by the analog gauge in response to application of the test signal, and storing the difference between the anticipated value and the observed value in a memory associated with the analog gauge.

3. A method as set forth in claim 1, wherein the step of providing the analog gauge offset value to the controller includes accessing the value stored in a memory associated with the analog gauge.

4. A method as set forth in claim 1, wherein the step of determining the analog gauge offset value is performed prior to the analog gauge being installed in the system.

5. A method as set forth in claim 1, wherein the step of determining the analog gauge offset value includes applying an analog gauge input signal corresponding to a theoretical midpoint value of the analog gauge, and measuring the offset of an indicator of the gauge from the theoretical midpoint value.

6. A method as set forth in claim 1, wherein the step of determining the analog gauge offset includes determining the analog gauge offset for a plurality of anticipated analog display values, and further comprises the step of storing the analog gauge offsets in an associated memory from which the values can be provided to the controller.

7. A method as set forth in claim 1, wherein the step of determining the analog gauge offset includes using an electronic sensor to detect a value indicated by the analog gauge in response to application of the analog gauge input signal.

8. A system having both an analog gauge and a digital display for displaying common information comprising: an analog gauge adapted to receive an analog gauge input signal and, in response thereto, indicate a value; a digital display adapted to receive a digital gauge input signal and in response thereto display a digital value; and a controller for generating the digital gauge input signal and sending said signal to the digital display; wherein the controller is configured to receive an analog gauge offset value corresponding to a difference between an anticipated analog gauge display value and a value physically indicated by the analog gauge, and generate the digital gauge input signal by adding the analog gauge offset value to the analog gauge input signal; whereby the analog gauge and the digital display are configured to display a common value at the same time.

9. A system as set forth in claim 8, further comprising a memory for storing at least one analog gauge offset value, the memory being accessible by the controller for providing the at least one gauge offset thereto.

10. A system as set forth in claim 9, wherein a plurality of gauge offset values are stored in the memory, each gauge offset value corresponding a different anticipated analog gauge display value.

11. A system as set forth in claim 10, wherein the controller is configured to utilize a gauge offset value corresponding to the analog gauge input value for generating the digital gauge input signal.

12. A system as set forth in claim 8, wherein the analog gauge includes a speedometer, and the digital display includes a digital speed display.

13. A system as set forth in claim 8, wherein the digital display is associated with a cruise control system of an automobile.

14. An analog gauge comprising: a gauge face having at least one marking corresponding to a value; a moveable indicator adapted to move relative to the at least one marking for indicating a value when an analog input signal is provided to the gauge; and a memory for storing at least one analog gauge offset value corresponding to a difference between an anticipated analog gauge display value and a value physically indicated by the analog gauge wherein the difference is a subtraction of the anticipated analog gauge display value from the value physically indicated by the analog gauge.

15. An analog gauge as set forth in claim 14, wherein the gauge is configured to provide the analog gauge offset value to a controller configured to use the analog gauge offset value to generate a digital display signal for a digital display that corresponds to a value indicated by the analog display for a given analog display input signal.

16. An analog gauge as set forth in claim 14, wherein the analog gauge includes a speedometer.

* * * * *